(12) United States Patent
Ye et al.

(10) Patent No.: US 7,878,158 B2
(45) Date of Patent: Feb. 1, 2011

(54) FORWARD COMBUSTION TYPE CONDENSING GAS WATER HEATER

(75) Inventors: Yuanzhang Ye, Foshan (CN); Xiaoe Tang, Foshan (CN)

(73) Assignee: Guangdong Vanward New Electric Co., Ltd, Foshan (CN)

( * ) Notice: Subject to any disclaimer, the term of this patent is extended or adjusted under 35 U.S.C. 154(b) by 470 days.

(21) Appl. No.: 11/964,481

(22) Filed: Dec. 26, 2007

(65) Prior Publication Data

US 2008/0251034 A1   Oct. 16, 2008

(30) Foreign Application Priority Data

Apr. 14, 2007   (CN) .................... 2007 2 0050382 U

(51) Int. Cl.
*F22B 1/02* (2006.01)
(52) U.S. Cl. .................. 122/18.1; 122/31.1; 122/135.3; 122/175
(58) Field of Classification Search ................. 122/18.1, 122/32, 33, 31.1, 135.3, 140.2, 159, 175
See application file for complete search history.

(56) References Cited

U.S. PATENT DOCUMENTS

| | | | | |
|---|---|---|---|---|
| 4,651,680 A * | 3/1987 | Couprie | .................... | 122/20 B |
| 6,907,846 B2 * | 6/2005 | Hur et al. | ....................... | 122/32 |
| 7,353,781 B2 * | 4/2008 | Jung et al. | .................... | 122/33 |
| 7,434,545 B2 * | 10/2008 | Lo et al. | .................. | 122/367.3 |
| 7,458,340 B2 * | 12/2008 | Takeda et al. | .............. | 122/31.1 |
| 7,614,366 B2 * | 11/2009 | Arnold et al. | .............. | 122/18.1 |

* cited by examiner

*Primary Examiner*—Gregory A Wilson
(74) *Attorney, Agent, or Firm*—Dovas Law, P.C.

(57) ABSTRACT

A forward combustion type condensing gas water heater is provided including a burner, a primary heat exchanger, a drain pipe for condensation water, a gathering and discharge device for condensation water, a secondary heat exchanger. The gathering and discharge device and the secondary heat exchanger have center lines different from the primary heat exchanger. Flue gas rises through the primary heat exchanger and passes through the secondary heat exchanger in a direction staggered with respect to the falling direction of condensation water. The condensing gas water heater effectively avoids resistance between the condensation water and the flue gas and prevents the condensation water from flowing to the burner, the combustion chamber, and the ignition pin.

12 Claims, 3 Drawing Sheets

FORWARD COMBUSTION TYPE CONDENSING GAS WATER HEATER

BACKGROUND OF THE INVENTION

The present invention relates to a condensing gas water heater, in particular to a forward combustion type condensing gas water heater.

Typically, known condensing gas water heaters carry out two heat exchanges during a heat exchange process. After hot flue gas is subjected to the first heat exchange, the temperature of the flue gas drops, and after the flue gas is subjected to the second heat exchange, the temperature further drops, below the dew point, and the vapor in the flue gas condenses into liquid water, thus releasing vaporization heat.

Known condensing gas water heaters typically employ one of two types of combustion, inverted combustion or forward combustion. In the inverted combustion type condensing gas water heater, the condenser is located below the burner, and in use, the condensation water can not (even in a failure condition) flow to the burner, the heat exchanger, the combustion chamber, the ignition pin, or other associated components. In the forward combustion type condensing gas water heater, the condenser is located above the burner, and normally a water gathering device is provided. In normal use, condensation water will not drop to the burner, the heat exchanger, the combustion chamber, the ignition pin, or other associated components. However, after use for a certain period of time, condensation water may not drop smoothly due to the resistance of upward rising flue gas, and moreover the flue gas may not be exhausted smoothly. If a leakage occurs, the condensation water may flow to the burner, the heat exchanger, the combustion chamber, the ignition pin, or other associated components resulting in corrosion of these parts. Therefore, the life of the water heater may be shortened, while the insulating property of the ignition pin may be reduced, so that ignition failure and even deflagration may occur.

SUMMARY OF THE INVENTION

Having outlined the state of the prior art and its attendant shortcomings, it is an objective of the present invention to provide a forward combustion type condensing gas water heater which effectively avoids resistance between the condensation water and the flue gas, and prevents condensation water from flowing to the burner, the combustion chamber, the ignition pin or other associated components, and in which the drain pipe for condensation water is easy to assemble. Such a water heater should provide that leakage associated with a failure would be easily observed to improve the safety of use and increase the lifespan of the water heater.

To achieve the above objective, the present invention provides a forward combustion type condensing gas water heater which includes a burner, a primary heat exchanger, a drain pipe for condensation water, a gathering and discharge device for condensation water, and a secondary heat exchanger. The gathering and discharge device for condensation water and the secondary heat exchanger have center lines different from the primary heat exchanger. The drain pipe for condensation water extends outside the primary heat exchanger. Flue gas rises through the primary heat exchanger and passes through the secondary heat exchanger in a direction staggered with respect to the falling direction of condensation water, and the flue gas is exhausted from the top of the gathering and discharge device for condensation water.

Preferably, the flue gas travels through the primary heat exchanger and rises in front of the gathering and discharge device for condensation water, then the flue gas travels through the secondary heat exchanger in a direction at an angle of about 1 to 179 degrees with respect to a falling direction of condensation water, and then the flue gas is exhausted from the back of the top of the gathering and discharge device for condensation water.

In another embodiment, the flue gas travels through the primary heat exchanger and rises in the back of the gathering and discharge device for condensation water, then the flue gas travels through the secondary heat exchanger in a direction at an angle of about 1 to 179 degrees with respect to a falling direction of condensation water, and is exhausted from the front of the top of the gathering and discharge device for condensation water.

In another embodiment, the flue gas rises through the primary heat exchanger, then the flue gas travels through the secondary heat exchanger in a direction at an angle of about 10 or 60 or 90 or 170 degrees with respect to a falling direction of condensation water, and is exhausted from the top of the gathering and discharge device for condensation water.

Preferably, the drain pipe for condensation water extends downwards outside the primary heat exchanger.

Preferably, the drain pipe is provided on the lowest portion of the gathering and discharge device for condensation water.

The condensing gas water heater of the present invention provides the following advantages: The gathering and discharge device for condensation water and the secondary heat exchanger have center lines different from the primary heat exchanger. The drain pipe for condensation water extends outside the primary heat exchanger, and the flue gas rises in a direction staggered with respect to the falling direction of condensation water. Therefore, the forward combustion type condensing gas water heater of the present invention avoids the resistance between the condensation water and the flue gas effectively, and prevents condensation water from flowing to the burner, the combustion chamber, the ignition pin, or other associated components. The drain pipe for condensation water is easy to assemble. If leakage occurs, it is easily observed, improving the safety and the lifespan of the water heater.

DETAILED DESCRIPTION OF THE INVENTION

Figure 1:
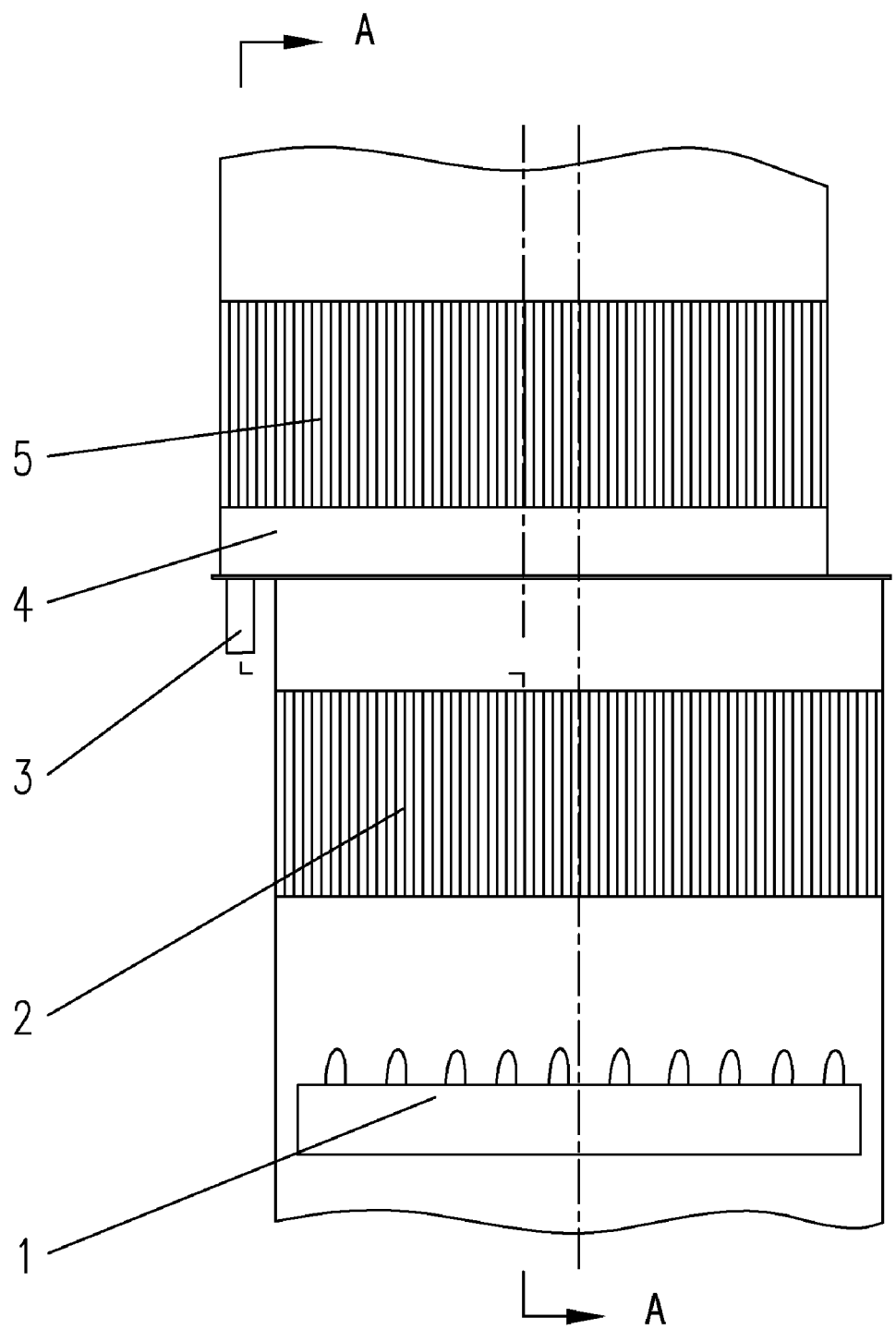
FIG. 1 is a front elevation view of a condensing gas water heater according to a preferred embodiment of the present invention.
Figure 2:
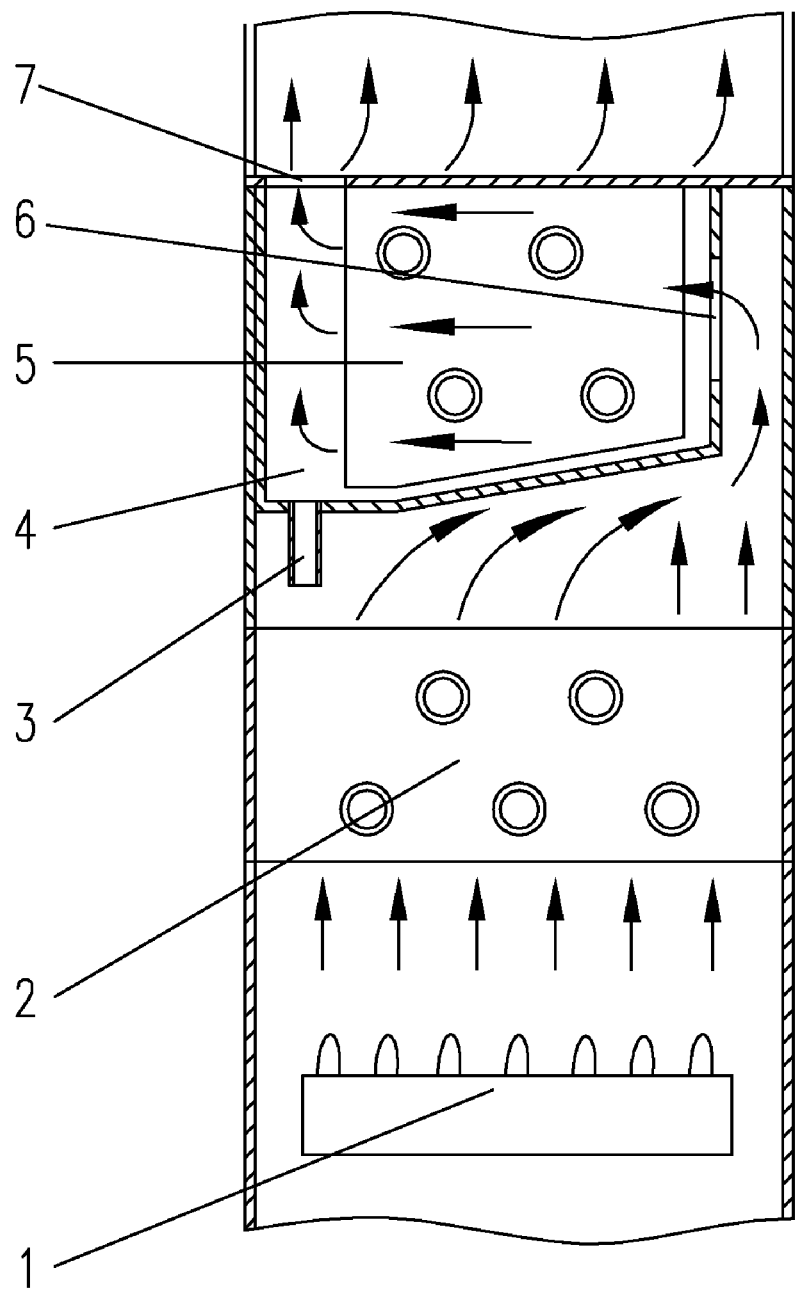
FIG. 2 is a cross-section view of the condensing gas water heater shown in FIG. 1 taken along line 2-2 of FIG. 1.
Figure 3:
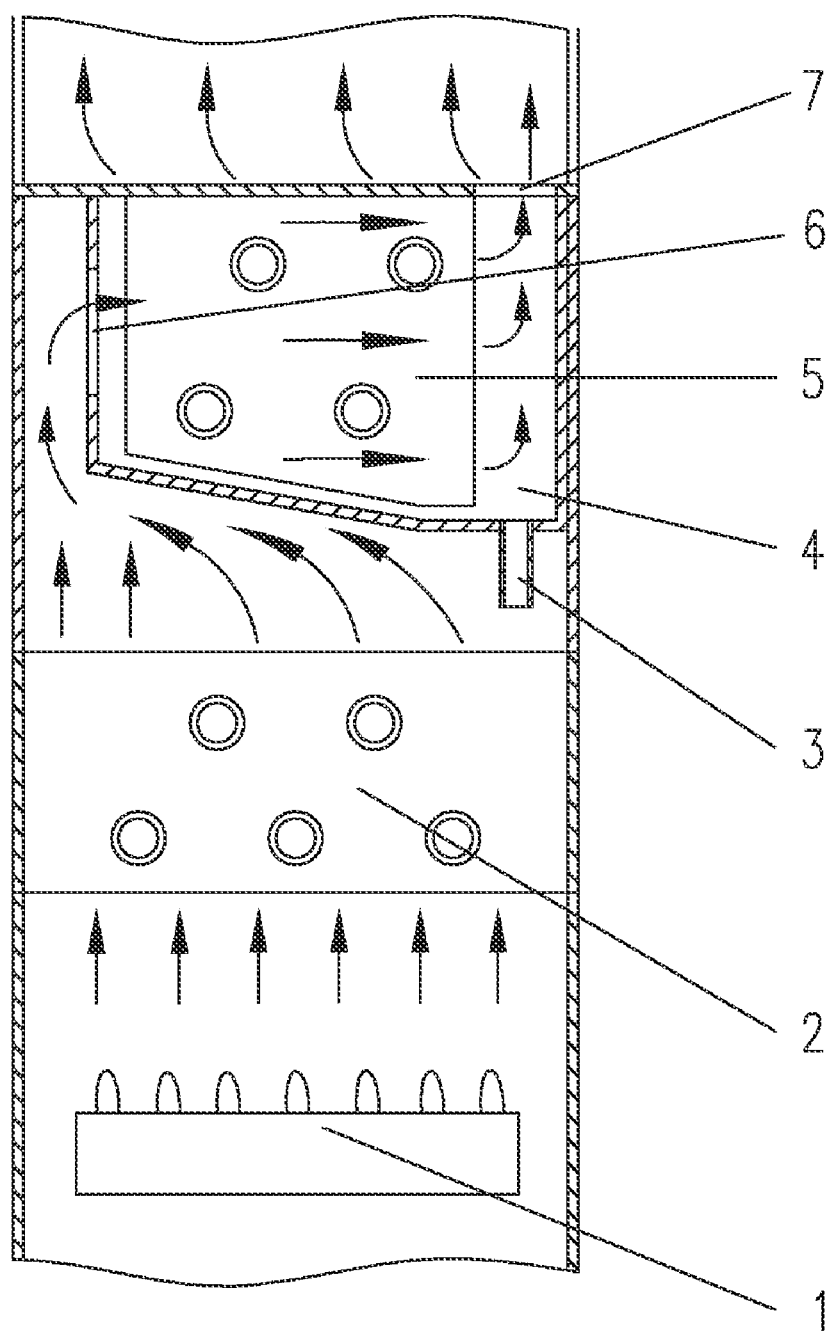
FIG. 3 is an alternative cross-section view of the condensing gas water heater shown in FIG. 1 taken along line 2-2 of FIG. 1.

Referring to FIG. 1, FIG. 2, and FIG. 3 a condensing gas water heater according to a preferred embodiment of the present invention is shown. The condensing gas water heater comprises a burner 1, a primary heat exchanger 2, a drain pipe for condensation water 3, a gathering and discharge device for condensation water 4 and a secondary heat exchanger 5. The burner 1 is located right below the primary heat exchanger 2, and combustion is provided in a vertical upward manner. The secondary heat exchanger 5 is provided above the primary heat exchanger 2. The gathering and discharge device for condensation water 4 is disposed between the primary heat exchanger 2 and the secondary heat exchanger 5.

The gathering and discharge device for condensation water 4 and the secondary heat exchanger 5 have a center line different from that of the primary heat exchanger 2. The gathering and discharge device 4 surrounds the secondary heat exchanger 5, and an intake aperture 6 (or slot or netting, or other suitable opening configuration) is provided for conducting the flue gas into the secondary heat exchanger 5 to carry out heat exchange in the front or back of the gathering and discharge device 4. An exhaust aperture 7 (or slot or netting, or other suitable opening configuration) for exhausting the flue gas is provided on the top of the gathering and discharge device 4. The gathering and discharge device 4 is inclined slightly in the front and back sides or alternatively on the left and right sides. The drain pipe for condensation water 3 is arranged at the lowest portion of the gathering and discharge device 4, and extends downwards and outside the primary heat exchanger 2.

After traveling through the primary heat exchanger 2, the flue gas generated by the combustion of natural gas enters into the secondary heat exchanger 5 via the front portion as shown in FIG. 2, or alternatively the back portion as shown in FIG. 3, of the gathering and discharge device 4, which is different from the falling direction of condensation water. As shown in FIG. 2 and the alternative view of FIG. 3, the flue gas path is configured for flue gas to flow approximately 90 degrees of the falling direction of the condensation water, or in other words 90 degrees from vertical (perpendicular). Alternatively, the flue gas path may be configured for flue gas to flow at any suitable angle from 1 to 179 degrees with respect to the falling direction of condensation water, but more preferably at one of 10, 60, 90 and 170 degrees with respect to the falling direction of condensation water. After passing through the secondary heat exchanger 5, the flue gas is exhausted upwards from the back as shown in FIG. 2, or alternatively the front as shown in FIG. 3, of the gathering and discharge device for condensation water 4.

The condensation water generated after the flue gas travels through the secondary heat exchanger 5 will drop into the gathering and discharge device 4 due to the condensation water's own weight, and gather at the lowest portion of the gathering and discharge device 4 along the inclined plane, and finally discharge through the drain pipe for condensation water 3. As shown, the flue gas travels in approximately the same direction as the condensation water flowing down the inclined plane. As such, a flow of condensation water is not hindered by a flow of flue gas.

The invention claimed is:

1. A forward combustion type condensing gas water heater comprising:
   a flue gas path;
   a burner for producing heated flue gas for passage through the flue gas path;
   a primary heat exchanger within the flue gas path;
   a secondary heat exchanger within the flue gas path;
   a gathering and discharge device for condensation water within the flue gas path in fluid connection with the secondary heat exchanger; and
   a drain pipe for condensation water connected to the gathering and discharge device for condensation water;
   wherein the gathering and discharge device for condensation water and the secondary heat exchanger have center lines different from a center line of the primary heat exchanger, the drain pipe for condensation water extends outside the primary heat exchanger and is provided on a lowest portion of the gathering and discharge device for condensation water, and the flue gas path is configured for flue gas to rise through the primary heat exchanger and then pass through the secondary heat exchanger in a direction staggered with respect to a falling direction of condensation water.

2. The condensing gas water heater of claim 1, wherein the flue gas path is configured for flue gas to first travel through the primary heat exchanger and then rise to a front portion of the gathering and discharge device for condensation water, and next for flue gas to travel through the secondary heat exchanger in a direction at an angle of about 1 to 179 degrees with respect to a falling direction of condensation water, and then for flue gas to be exhausted from a back portion of a top portion of the gathering and discharge device for condensation water.

3. The condensing gas water heater of claim 1, wherein the flue gas path is configured for flue gas to first travel through the primary heat exchanger and then rise to a back portion of the gathering and discharge device for condensation water, and next for flue gas to travel through the secondary heat exchanger in a direction at an angle of about 1 to 179 degrees with respect to a falling direction of condensation water, and next for flue gas to be exhausted from a front portion of a top portion of the gathering and discharge device for condensation water.

4. The condensing gas water heater of claim 1, wherein the drain pipe for condensation water extends downwards outside of a portion of the flue gas path occupied by the primary heat exchanger.

5. The condensing gas water heater of claim 1, wherein the flue gas path is configured for flue gas to first travel through the primary heat exchanger and then rise to a front portion of the gathering and discharge device for condensation water, and next for flue gas to travel through the secondary heat exchanger in a direction at an angle of about 10 degrees with respect to a falling direction of condensation water, and then for flue gas to be exhausted from a top portion of the gathering and discharge device for condensation water.

6. The condensing gas water heater of claim 1, wherein the flue gas path is configured for flue gas to first travel through the primary heat exchanger and then rise to a front portion of the gathering and discharge device for condensation water, and next for flue gas to travel through the secondary heat exchanger in a direction at an angle of about 60 degrees with respect to a falling direction of condensation water, and then for flue gas to be exhausted from a top portion of the gathering and discharge device for condensation water.

7. The condensing gas water heater of claim 1, wherein the flue gas path is configured for flue gas to first travel through the primary heat exchanger and then rise to a front portion of the gathering and discharge device for condensation water, and next for flue gas to travel through the secondary heat exchanger in a direction at an angle of about 90 degrees with respect to a falling direction of condensation water, and then for flue gas to be exhausted from a top portion of the gathering and discharge device for condensation water.

8. The condensing gas water heater of claim 1, wherein the flue gas path is configured for flue gas to first travel through the primary heat exchanger and then rise to a front portion of the gathering and discharge device for condensation water, and next for flue gas to travel through the secondary heat exchanger in a direction at an angle of about 170 degrees with respect to a falling direction of condensation water, and then for flue gas to be exhausted from a top portion of the gathering and discharge device for condensation water.

9. The condensing gas water heater of claim 1, wherein the flue gas path is configured for flue gas to be exhausted from a top of the gathering and discharge device for condensation water, generally opposite the drain pipe.

10. A condensing gas water heater comprising:

a flue gas path;

a burner for producing heated flue gas for passage through the flue gas path;

a secondary heat exchanger within the flue gas path;

a primary heat exchanger within the flue gas path substantially between the burner and the secondary heat exchanger;

a gathering and discharge device for condensation water forming at least a portion of the flue gas path and positioned to receive falling condensation from the secondary heat exchanger; and a drain pipe for condensation water comprising an inlet connected to the gathering and discharge device for condensation water and an outlet directed outside of the flue gas path;

wherein the gathering and discharge device comprises an inclined plane configured to provide a direction of flow of condensation water which is approximately aligned with a direction of flow of flue gas along the flue gas path, whereby a flow of condensate water is not hindered by a flow of flue gas.

11. The condensing gas water heater of claim 10, wherein the flue gas path is configured to provide a direction of flow of flue gas substantially angled with respect to a falling direction of condensation water from the secondary heat exchanger.

12. The condensing gas water heater of claim 10, wherein the flue gas path is configured to provide a direction of flow of flue gas approximately perpendicular with respect to a falling direction of condensation water from the secondary heat exchanger.

* * * * *